Sept. 30, 1958 S. L. KOMARIK 2,854,342
METHOD OF CURING PORK BELLIES
Filed Dec. 19, 1956
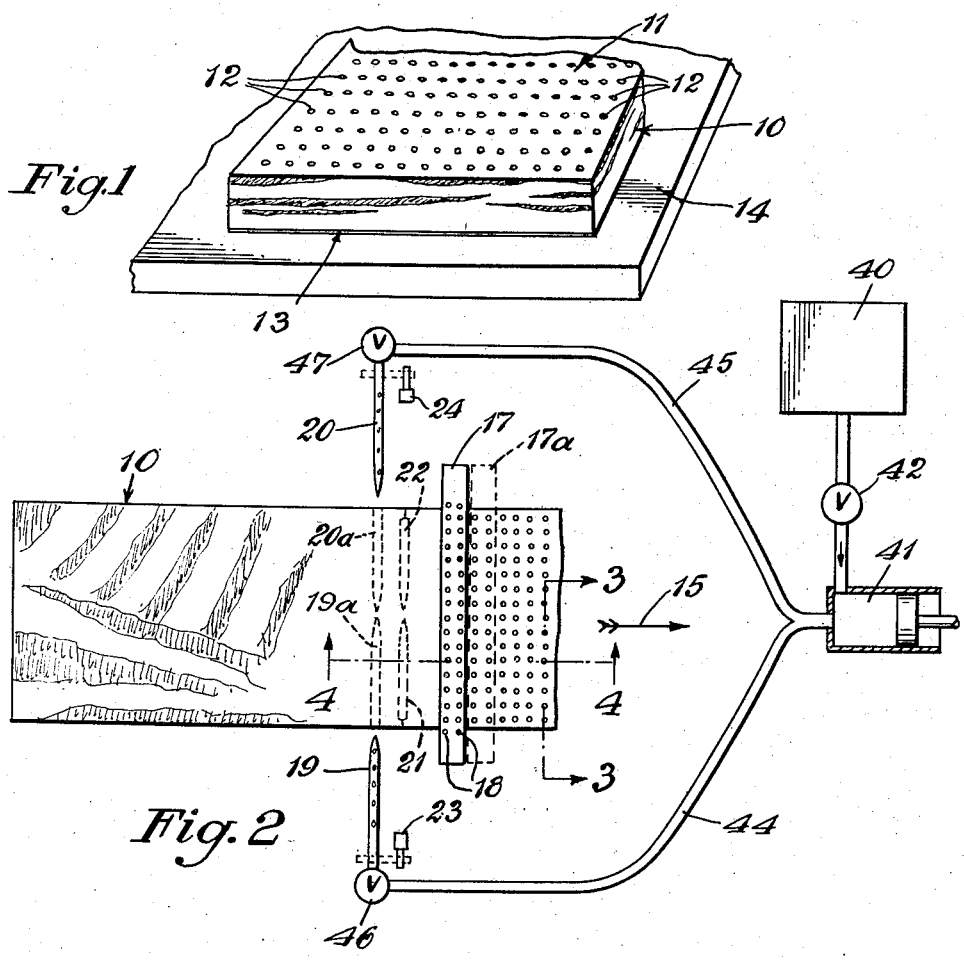
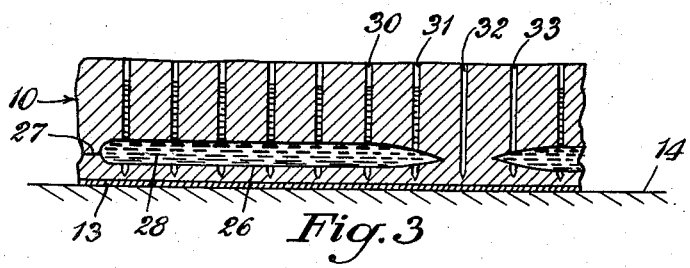
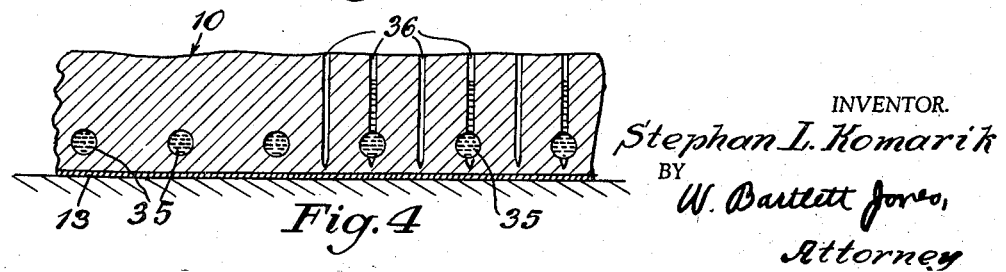
INVENTOR.
Stephan L. Komarik
BY
W. Bartlett Jones,
Attorney

2,854,342

METHOD OF CURING PORK BELLIES

Stephan L. Komarik, Chicago, Ill., assignor to The Griffith Laboratories, Inc., Chicago, Ill., a corporation of Illinois Application December 19, 1956, Serial No. 629,370

10 Claims. (Cl. 99—159)

The present invention relates to curing pork bellies for the production of bacon, and in particular to improved methods for rapidly introducing curing salt solution into the belly.

Bacon is produced in one general method by variously applying a solid curing salt composition to the belly for dissolution therein by the natural juices of the belly. It is produced in another general way by injecting curing salt solution into the interior of the belly at a multiplicity of locations.

The injection method is carried out by inserting perforated needles into a face of the belly, and then under pressure forcing the salt solution through openings in the needles, thus forming localized pools within the belly. These pressure-formed pools break the natural connection between the layers of fat and lean, so that the finished bacon in the slice exhibits the rupture, which is detrimental to sales appeal.

In my prior patents U. S. No. 2,688,555, and 2,688,556, I have described methods to cure such bellies by the use of needles which do not inject liquid, and in a manner to provide a multiplicity of temporarily open pores into the belly. The porous belly may be immersed in brine for permeating the belly via the pores, or it may be "dry-salt cured." For dry-salt curing, solid curing salt composition is spread over the face having such pores for dissolution by the natural juices and for distribution within the belly. A curing period of time is involved.

However, many packers prefer to process the bellies more quickly by injecting curing solution rather than by applying solid curing salt composition.

The present invention aims to combine my prior process in which temporarily open pores are provided with a modification of the injection method.

It is the general object of the invention to provide a rapid method for introducing curing salt solution into pork bellies without visibly damaging the structure of the bacon as it appears in the slice.

It is a particular object of the invention to utilize temporary pores in a pork belly as channels for the dissemination of aqueous curing salt solution from pools thereof implanted within the fat of the belly.

Various other and ancillary objects and advantages of the invention will become apparent from the following description and explanation of the invention, in which:

Fig. 1 illustrates an end cut of a chilled pork belly with the perforations unclosed.

Fig. 2 represents diagrammatically in plan view the nature of the processing as the belly passes through the machine.

Fig. 3 is a fragmentary cross-section on line 3—3 of Fig. 2 of a treated belly showing the location of pickle liquor before diffusion.

Fig. 4 is a fragmentary longitudinal section on line 4—4 of Fig. 2, showing the mutual relations of the pools and perforations.

A pork belly normally has a substantially lean-free layer of fat on the skin face, and a concentration of its lean content on the opposite rib-face. The layer of fat is sufficiently thick so that one may readily enter an injection needle into it and form a localized pool of curing salt solution, without locating the pool at the interface of lean and fat. Solution so deposited will in time diffuse through the fat and to the lean to effect a cure.

In the interest of rapid curing the time is greatly shortened by forming a multiplicity of said pools in the fat in locations to distribute the solution substantially uniformly over the area of the belly, and in addition forming a multiplicity of temporary pores inwardly from the lean-face of the belly into or closely adjacent the said pools. Thereby the liquid in the pools enters said pores, either by direct communication or by diffusion through but a small extent of fat. From the pores the liquid then diffuses laterally into the entire belly and only through small extents of belly material.

The process may be carried out in numerous ways. It is preferred first to form the pools in fat, and then to form the pores. Because the locations of some pores may intersect a location of a pool, and because the liquid is under pressure in forming a pool, the pool is formed before forming the pores. Otherwise, the pool liquid might squirt out from the belly by way of one or more pores, leaving an area deficient in curing salt.

To form pools, injector needles may enter the fat from any location, such as the fat face or from one or both lateral edges of the belly, in preference to entering the fat from the lean face. The preferred needles have discharge holes spaced along the shank, and to enter such a needle through the lean face leads to the danger of rupturing the bond between lean and fat as mentioned above.

Since the needles form openings which do not close on removal of the needle, when the belly is chilled, the location of the needle entry is important. If the entry is such that the pool formed within it may drain out, the entry is promptly closed. By locating the entry in fat, the fat around the entry may be readily displaced mechanically to seal the entry. Hence, the preferred entry is in the fat.

The preferred way to form the pools is to position the belly horizontally fat-side down, then horizontally to enter opposing injector needles into the fat at the sides of the belly, substantially to the median line, and at regularly spaced intervals, then to force a measured charge of the liquid through a plurality of holes along the shank but within the fat, then withdrawn the needles, and then plug the entry by displacing the fat.

Thereafter, the temporary pores are formed in the belly by entering pointed pins into the lean face to extend for a distance close to the bottom face without passing through the belly, and preferably passing the locations of the pools. Thereafter the belly is ready for immediate hanging in the smoke house.

Mechanically, all the pools may be formed at one time by using a suitable number of needles. Likewise, all the pores may be formed at one time, as for example by use of the apparatus shown in the Komarik and Griffith U. S. Patent No. 2,688,151. However, the cost and maintenance of apparatus for the one-shot processes of forming pools and pores, are considerable, and may be avoided by use of less expensive equipment in which successive regions of a belly moving through a machine are treated by forming the pools and immediately thereafter forming pores.

In the copending U. S. application of Brown Serial No. 437,413, now Patent No. 2,816,320, issued December 17, 1957, there is shown a machine for forming temporary pores by repeatedly entering and removing a bank of pore-forming pins as a belly moves through the machine.

The present invention may be practiced with said machines equipped with additional mechanism for timed operation of pool-forming injector needles with respect to the operation of the pore-forming pins. The pertinent function of it is indicated in the following description of the drawing.

A pork belly 10 is shown in Fig. 1 horizontally positioned as it appears after processing. It has its lean face 11 upward with a multiplicity of temporary pores 12 in the face 11 extending inwardly to a region close to but above the bottom face 13 as it lies on a flat horizontal platform 14.

Fig. 2 diagrammatically represents said belly 10 moving to the right as indicated by arrow 15, through a processing machine. The machine has a bank of substantially vertical pins, which bank moves up and down in repeating cycles and horizontally back and forth in concurrent repeating cycles, as described in said Serial No. 437,413. The horizontal movement of the bank with the pins inserted in the belly is the preferred means for effecting advance of the belly.

The described operation is as follows: With the belly stationary on the horizontal platform of the machine, the bank moves down to insert the pins in the belly. Then it moves the belly along by the pins in it. As it so moves the belly, the pins move in the upstroke and the advanced belly is stripped from them, again becoming stationary. Then the bank moves in the reverse horizontal direction and then down to repeat the two cycles.

In Fig. 2 the bank of pins is represented by its mounting member 17 in its extreme horizontal penetrating position, the spots 18 representing two rows of pins. The dotted lines 17ª represent the other extreme of its horizontal movement, and the separating distance is slightly less than the increment of advance movement of the belly, because of a swinging movement of the member 17.

While the belly is stationary without pins within it, that is, while the member 17 moves from position 17ª back to penetrating position, injector needles 19 and 20 move into the fat of the belly from the full-line positions shown to the dotted line positions 19ª and 20ª, and halt. A charge of solution is then injected through the several holes along the shank of the needle. Then the needles are withdrawn. Then the belly is penetrated over a portion already provided with pools, and the belly is advanced by the pore-forming pins to a new position.

The dotted lines 21 and 22 represent pools of liquid last formed in the operations described and located just ahead of the region to be penetrated by the pins. When the needles 19 and 20 move in, the same stroke carries pressing plugs 23 and 24 to the sides of the belly to move the fat and close the entries into the pools 21 and 22, so that the immediately following pressure from the bank of pins does not squeeze out the liquid. The injection of liquid and the closing of the entries in the fat which remain on withdrawing the needles, constitute forming pools of liquid within the fat.

Fig. 3 shows in a cross-section of one half of the belly, a pool 26 closed off at 27, with liquid 28 therein. A number of pores are shown from the face 11. Two pores 30 and 31 are shown as made by pins passing through the pool, and consequently liquid of the pool is shown in these pores. Two pores 32 and 33 are shown as close to the pool but isolated from it by thin regions of fat.

Fig. 4 is a fragmentary longitudinal cross-section of the completed belly showing pools 35 with liquid in them, and pores 36 some of which communicate with a pool, and others of which do not.

Specifically, as an illustration, the following dimensions are satisfactory.

*For pools.*—Each injector is ¼ inch in outside diameter, and the two penetrate in opposition to each other to within about ¼ inch of meeting. It discharges 10 to 20 ml. of curing salt solution depending on the size of the belly and the liquor composition. The needle entries are spaced approximately 1 inch apart, and are centered ¼ inch above the bottom fat face 13 which is preferably the retained skin. The machine is constructed to operate at 80 strokes per minute. The injector needles are withdrawn just before the advancing half-stroke and again inserted at the beginning of the return half-stroke of the pins. As a result the opening to a pool is closed in approximately 0.38 sec.

*For pores.*—The pins are 0.104 inch in diameter and are in two rows spaced ½ inch apart, and in each row are spaced ½ inch apart. The length of the horizontal cycle is 1 inch, with the result that a regular pattern of holes on approximately ½ inch squares is the result.

Various means may be provided to measure and time the injection of salt solution. One method is shown in Fig. 2. A supply 40 of curing salt solution is connected to a measuring cylinder 41 through a one-way valve 42, which refills the cylinder. A piston is moved by means not shown, when the needles are fully inserted. The cylinder discharges into feed lines 44 and 45, through cut-off valves 46 and 47, respectively, to the needles 19 and 20. The valves 46 and 47 are opened only when the piston moves, thus cutting off on closing any backfeed from the belly into the needles.

From the foregoing it will be appreciated that the process may be carried out in numerous ways without departing from the spirit and scope of the invention as expressed in the appended claims.

I claim:

1. The method comprising forming localized pools of aqueous curing salt solution within the fat of the fatty side of a chilled green pork belly at a multiplicity of locations distributed over the area of the belly, forming multiple artificial pores in said belly opening into the lean face thereof by mechanically crowding the substance of the belly away from the space for each pore, said pores being sufficiently small in area to remain open in the chilled condition of the belly and to close on elevating the temperature of the belly, said pores extending from the lean face to a region within the opposite fatty face and being located at least close to the said pools, whereby liquid in said pools and entering said pores from the pools is quickly absorbed and by diffusion is distributed substantially uniformly throughout the belly.

2. The method comprising forming localized pools of aqueous curing salt solution within the fat of the fatty side of a chilled green pork belly at a multiplicity of locations distributed over the area of the belly, forming multiple temporary artificial pores in said belly from the lean face to a depth short of passage through the belly and in close proximity to said pools, whereby liquid in said pools and entering said pores from the pools is quickly absorbed and by diffusion is distributed substantially uniformly throughout the belly.

3. The method comprising forming localized pools of aqueous curing salt solution within the fat of the fatty side of a chilled green pork belly at a multiplicity of locations distributed over the area of the belly and at substantially the same level inwardly from the plane of the fatty face, forming multiple temporary artificial pores in said belly from the lean face to a depth short of passage through the belly and in close proximity to said pools, whereby liquid in said pools and entering said pores from the pools is quickly absorbed and by diffusion is distributed substantially uniformly throughout the belly.

4. The method of claim 3 in which the pores extend at least to the level of the pools.

5. The method of claim 3 in which the pores extend beyond the level of the pools.

6. The method comprising forming localized pools of aqueous curing salt solution within the fat of the fatty side of a chilled green pork belly at a multiplicity of locations distributed over the area of the belly, said pools being elongated in the direction parallel with the plane of the fatty face at substantially the same level inwardly from said plane, then forming multiple temporary artificial pores in said belly from the lean face toward the fatty face to a depth short of passage through the belly and in close proximity to said pools, whereby liquid in said pools and entering said pores from the pools is quickly absorbed and by diffusion is distributed substantially uniformly throughout the belly.

7. The method of claim 6 in which the pores extend at least to the level of the pools.

8. The method of claim 6 in which the pores extend beyond the level of the pools.

9. The method comprising forming localized pools of aqueous curing salt solution remote from the lean and in the fatty side of a chilled pork belly at a multiplicity of locations distributed over the area of the belly, forming multiple temporary artificial pores in said belly from the lean face to a depth short of passage through the belly and in close proximity to said pools, whereby liquid in said pools and entering said pores from the pools is quickly absorbed and by diffusion is distributed substantially uniformly throughout the belly.

10. The method comprising both forming multiple temporary artificial pores in a chilled green pork belly from the lean face thereof, and forming localized pools of aqueous curing salt solution within the belly at a multiplicity of locations distributed over the area of the belly and remote from the lean of the face, said pores and pools being at least close to each other, whereby liquid in said pools and entering said pores from the pools is quickly absorbed and by diffusion is distributed substantially uniformly throughout the belly.

References Cited in the file of this patent

UNITED STATES PATENTS

| | | |
|---|---|---|
| 2,688,555 | Komarik et al. | Sept. 7, 1954 |
| 2,688,556 | Komarik et al. | Sept. 7, 1954 |